US008699453B2

(12) United States Patent
Sundarraman et al.

(10) Patent No.: US 8,699,453 B2
(45) Date of Patent: Apr. 15, 2014

(54) REUSE OF RF RECEIVE CHAIN FOR HAND-IN ASSISTANCE

(75) Inventors: Chandrasekhar T. Sundarraman, San Diego, CA (US); Aleksandar M. Gogic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 622 days.

(21) Appl. No.: 12/695,924

(22) Filed: Jan. 28, 2010

(65) Prior Publication Data

US 2010/0195627 A1     Aug. 5, 2010

Related U.S. Application Data

(60) Provisional application No. 61/149,279, filed on Feb. 2, 2009.

(51) Int. Cl.
*H04W 4/00*     (2009.01)
*H04J 3/06*     (2006.01)

(52) U.S. Cl.
USPC .......................... 370/331; 370/336; 370/350

(58) Field of Classification Search
USPC ................................. 370/328, 331, 336, 350
See application file for complete search history.

(56) References Cited

U.S. PATENT DOCUMENTS

| 7,894,444 B2 * | 2/2011 | Lohr et al. ...................... 370/394 |
| 2002/0072370 A1 | 6/2002 | Johansson et al. |
| 2003/0174666 A1 | 9/2003 | Wallace et al. |
| 2003/0176189 A1 | 9/2003 | Merson et al. |
| 2004/0264407 A1 | 12/2004 | Tang et al. |
| 2005/0030919 A1 | 2/2005 | Lucidarme et al. |
| 2007/0218868 A1 * | 9/2007 | Schefczik et al. .......... 455/404.1 |
| 2008/0008152 A1 * | 1/2008 | Lohr et al. .................... 370/342 |
| 2008/0075061 A1 | 3/2008 | Hatala et al. |
| 2008/0119145 A1 * | 5/2008 | Lee et al. ...................... 455/101 |
| 2008/0188266 A1 | 8/2008 | Carter et al. |
| 2008/0244148 A1 | 10/2008 | Nix, Jr. et al. |
| 2009/0005099 A1 | 1/2009 | Jung et al. |

(Continued)

FOREIGN PATENT DOCUMENTS

| EP | 1107483 A1 | 6/2001 |
| WO | WO0008886 A1 | 2/2000 |
| WO | WO2009049207 | 4/2009 |
| WO | WO2009062076 | 5/2009 |

OTHER PUBLICATIONS

International Search Report and Written Opinion—PCT/US2010/022931, International Search Authority—European Patent Office—Jul. 27, 2010.

*Primary Examiner* — Farah Faroul
(74) *Attorney, Agent, or Firm* — Fariba Yadegar-Bandari

(57) ABSTRACT

A radio frequency receive chain of an access point is reused for different functions. For example, the same RF receive chain may be used to receive on a downlink at certain points in time and on an uplink at other points in time. An RF receive chain that is used to derive synchronization from downlink signals received from a macro system also may be used to receive uplink signals from an access terminal to provide assistance for hand-in of the access terminal. Accelerated searching for hand-in may be provided through the use of a relatively small search window for hand-in of an access terminal to a small coverage access point. In some aspects, the search window may be defined based on the distance between access points or calibration of synchronization error between access points.

25 Claims, 13 Drawing Sheets

(56) References Cited

U.S. PATENT DOCUMENTS

| | | |
|---|---|---|
| 2009/0097451 A1 | 4/2009 | Gogic |
| 2009/0129332 A1* | 5/2009 | Dayal et al. ............... 370/330 |
| 2009/0196259 A1* | 8/2009 | Pani et al. ................. 370/332 |
| 2010/0254344 A1* | 10/2010 | Wei et al. ................. 370/330 |
| 2010/0272204 A1* | 10/2010 | Fazel et al. ............... 375/267 |
| 2011/0009105 A1* | 1/2011 | Lee et al. .................. 455/418 |
| 2011/0223923 A1* | 9/2011 | Cho et al. .................. 455/448 |
| 2011/0275374 A1* | 11/2011 | Narasimha et al. ....... 455/436 |
| 2011/0287772 A1* | 11/2011 | Park et al. ................. 455/450 |
| 2012/0115481 A1* | 5/2012 | Kim et al. .................. 455/436 |

\* cited by examiner

REUSE OF RF RECEIVE CHAIN FOR HAND-IN ASSISTANCE

CLAIM OF PRIORITY

This application claims the benefit of and priority to commonly owned U.S. Provisional Patent Application No. 61/149,279, filed Feb. 2, 2009, and assigned, the disclosure of which is hereby incorporated by reference herein.

BACKGROUND

1. Field

This application relates generally to wireless communication and more specifically, but not exclusively, to improving communication performance.

2. Introduction

A wireless communication network is deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network. In general, at a given point in time, the access terminal will be served by a given one of these access points. As the access terminal roams throughout this geographical area, the access terminal may move away from its serving access point and move closer to another access point. In addition, signal conditions within a given cell may change, whereby an access terminal may be better served by another access point. In these cases, to maintain mobility for the access terminal, the access terminal may be handed-over from its serving access point to the other access point.

As the demand for high-rate and multimedia data services rapidly grows, there lies a challenge to implement efficient and robust communication systems with enhanced performance. To supplement conventional mobile phone network access points, small-coverage access points may be deployed (e.g., installed in a user's home) to provide more robust indoor wireless coverage to mobile units. Such small-coverage access points may be referred to as, for example, femto access points, femto cells, home NodeBs, home eNodeBs, or access point base stations. Typically, such small-coverage base stations are connected to the Internet and the mobile operator's network via a DSL router or a cable modem.

When an access terminal is on a call on a macro system and enters the wireless coverage of a femto access point, hand-in may be triggered to that femto access point. In practice, however, an identifier used to identify the femto access point may be subject to reuse, whereby multiple femto access points within the wireless coverage of the macro system may be assigned the same identifier. For example, there may be a relatively large number of femto access points within the coverage area of any given macro access point. Moreover, it is expected that femto access points may be deployed in an ad-hoc fashion. Thus, the identifiers assigned to these femto access points may overlap (e.g., as a result of individual decisions of homeowners that install the femto access points in their homes).

To resolve ambiguity as to which femto access point is the intended target for a given hand-in operation, a femto access point may employ an uplink (e.g., reverse link) receiver for acquiring signals transmitted by an approaching access terminal. In this way, hand-in preparation operations may be directed only to a femto access point that is close enough to the access terminal to receive signals from the access terminal.

In the event a large number of femto access points under a given macro access point are assigned the same identifier, the macro access point may direct all of these femto access points to attempt to acquire signals (e.g., the reverse link) transmitted by an access terminal that reported the detection of signals from one of these femto access points to the macro access point. The number of deployed femto access points compounds this hand-in problem since, not only are many femto access points being asked to determine if they are the intended target, but due to femto access point density, the number of active call hand-in attempts per access terminal increases.

In addition, in some cases a femto access point may employ additional radio frequency (RF) receivers. For example, a femto access point may employ an uplink receiver for receiving uplink signals from access terminals that connect to the femto access point. In addition, the femto access point may employ a downlink receiver for deriving synchronization from downlink signals received from a nearby macro access point. Such macro-based synchronization may be used, for example, in a case where GPS functionality is not supported or received GPS signals are too weak to acquire synchronization.

SUMMARY

A summary of sample aspects of the disclosure follows. In the discussion herein, any reference to the term aspects may refer to one or more aspects of the disclosure.

The disclosure relates in some aspects to reusing (e.g., multiplexing) an RF receive chain of an access point for different operations. By reusing a RF receive chain in this way, fewer RF receive chains may need to be employed in an access point, thereby reducing the cost of the access point.

The disclosure relates in some aspects to using the same RF receive chain to receive on a downlink at certain points in time and on an uplink at other points in time. For example, an RF receive chain that is used to derive synchronization from downlink signals received from a macro system also may be used to search for uplink signals from an access terminal to provide assistance for hand-in of the access terminal. Here, the RF receive chain may initially be configured to receive on the downlink whereby a clock is synchronized based on received downlink signals. Then, upon determining that hand-in assistance is needed, the RF receive chain may be temporarily configured to receive on the uplink to search for signals from an access terminal. During this hand-in assistance period, the clock may be allowed to free-run.

The disclosure relates in some aspects to providing accelerated searching for hand-in of an access terminal to an access point. For example, a relatively small search window may be employed for hand-in of an access terminal to a small coverage access point (e.g., a femto access point). In some aspects, the search window may be defined (e.g., the timing of the center of the search window may be defined) based on the distance between the small coverage access point and the access point (e.g., macro access point) that provides a timing reference for the access terminal being handed-in. In some aspects, the search window may be defined based on calibration of synchronization error between timing at the small coverage access point and timing at the access point that provides a timing reference for the access terminal.

BRIEF DESCRIPTION OF THE DRAWINGS

These and other sample aspects of the disclosure will be described in the detailed description and the appended claims that follow, and in the accompanying drawings, wherein:

Figure 1:
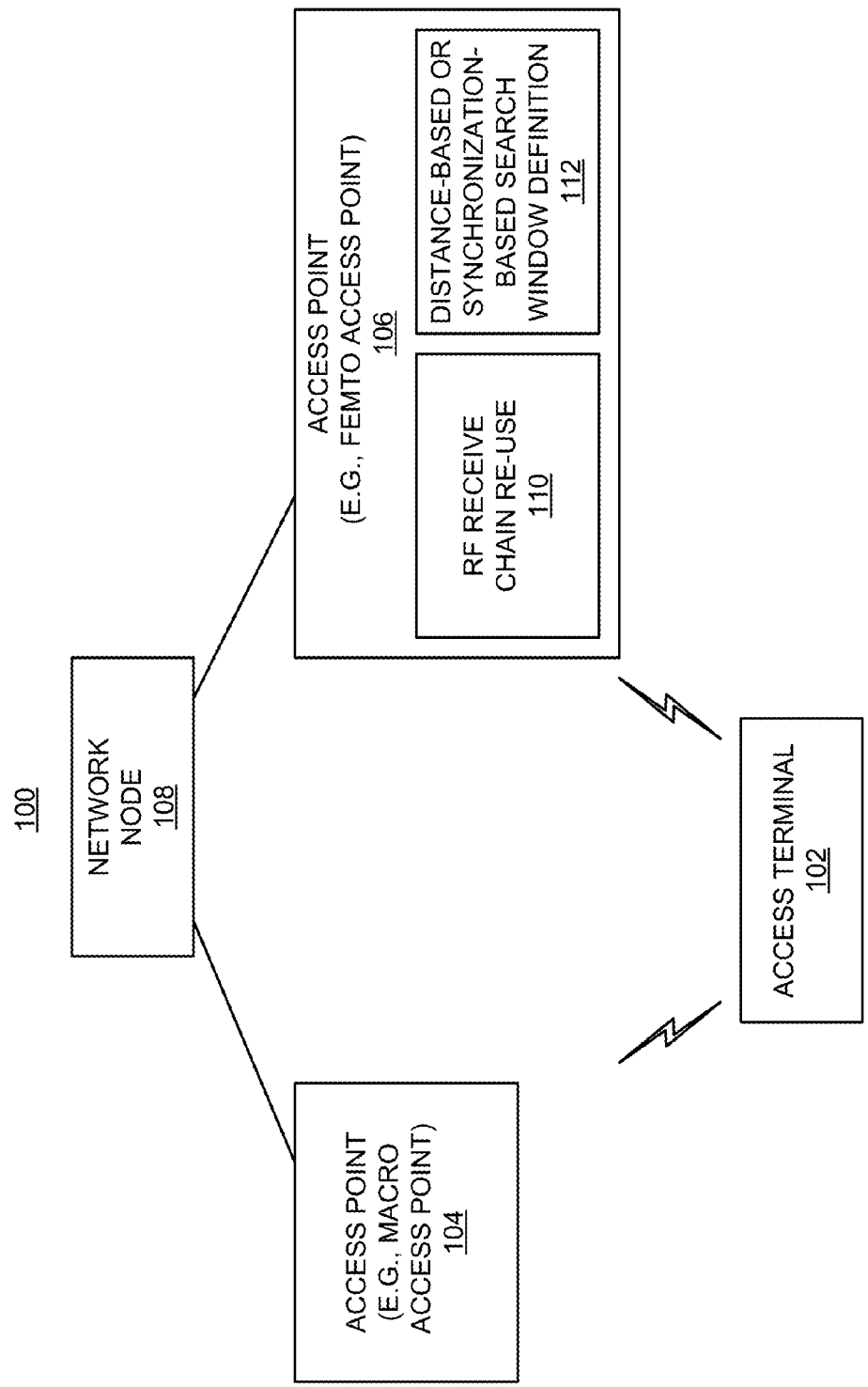
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, eNodeBs, cells, and so on, while access terminals may be referred to or implemented as user equipment, mobile stations, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, or some other access point (not shown). Each of the access points may communicate with one or more network nodes (represented, for convenience, by network node 108) to facilitate wide area network connectivity. These network nodes may take various forms such as, for example, one or more radio and/or core network entities. Thus, in various implementations the network node 108 may represent functionality such as at least one of: network management (e.g., via an operation, administration, management, and provisioning entity), call control, session management, mobility management, gateway functions, interworking functions, or some other suitable network functionality.

In accordance with the teachings herein, the access point 106 (and other access points in the system 100, not shown) may include RF receive chain reuse functionality 110 that enables a single RF receive chain to be reused for different functions. In particular, the RF receive chain may be used for receiving on a downlink and on an uplink at different points in time. For example, an RF receive chain that may otherwise be employed in a access point may be eliminated by using a single RF receive chain for receive synchronization operations and hand-in assistance operations. The majority of the time this RF receive chain is used to receive signals on a downlink band to synchronize a clock of the access point 106 (and to perform other functions as discussed herein). However, occasionally the RF receive chain is temporarily reconfigured to receive signals on an uplink band to enable hand-in assistance operations.

Also in accordance with the teachings herein, the access point 106 (and other access points in the system 100, not shown) may include search window definition functionality 112 that enables accelerated searches to be performed in conjunction with hand-in of an access terminal. In some aspects, a faster search is achieved through the use of a smaller search window. In addition, this smaller search window is defined (e.g., adjusted) for searching at the appropriate period of time based on either the distance between the access point 106 and another access point (e.g., access point 104) or calibration of synchronization error between the access point 106 and another access point (e.g., access point 104).

With the above overview in mind, various techniques that may be employed to reuse an RF receive chain and provide accelerated search in accordance with the teachings herein will be described with reference to FIGS. 2-6. Briefly, FIGS. 2 and 3 illustrate several components and operations that may be employed at an access point in conjunction with reusing an RF receive chain, while FIGS. 4-6 illustrate several concepts and operations that may be employed at an access point in conjunction with providing accelerated searching.

Figure 2:
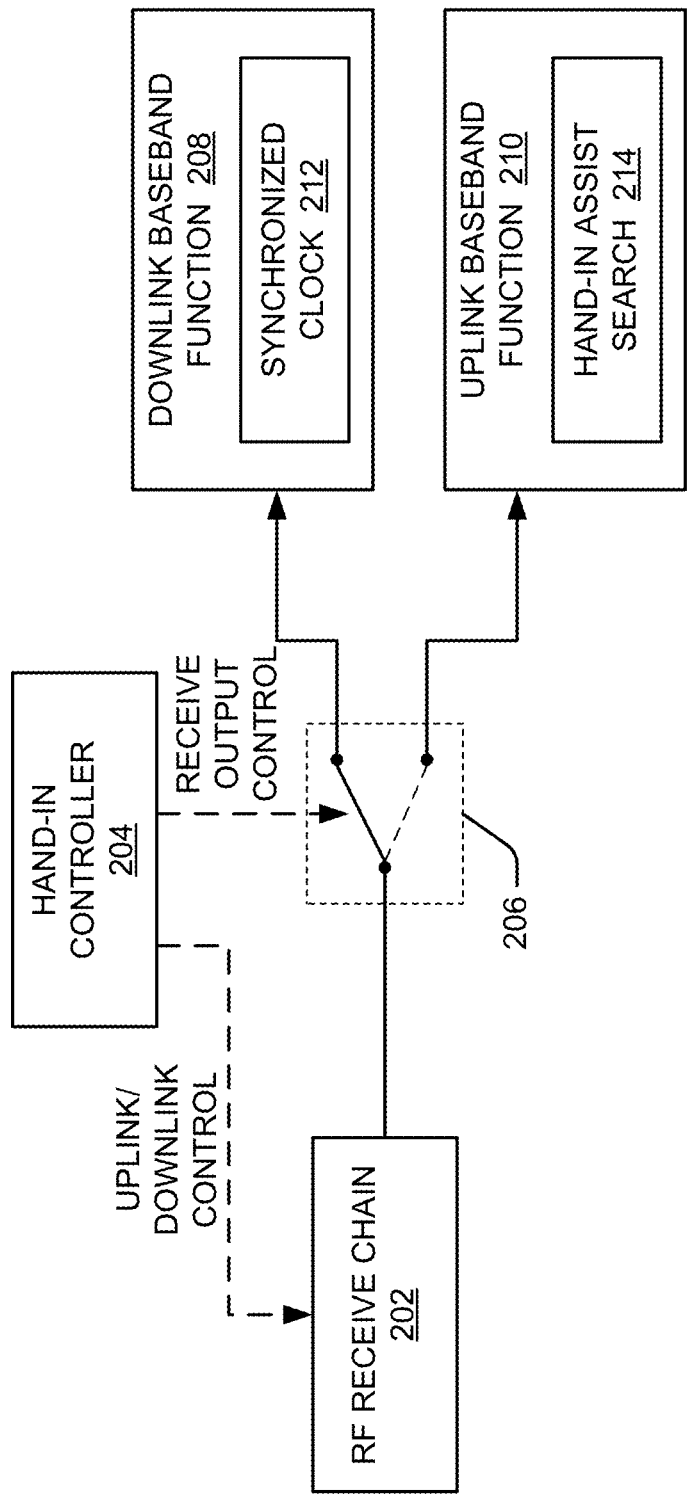
FIG. 2 is a simplified block diagram of several sample aspects of components adapted to accomplish RF receive chain reuse.
Figure 3:
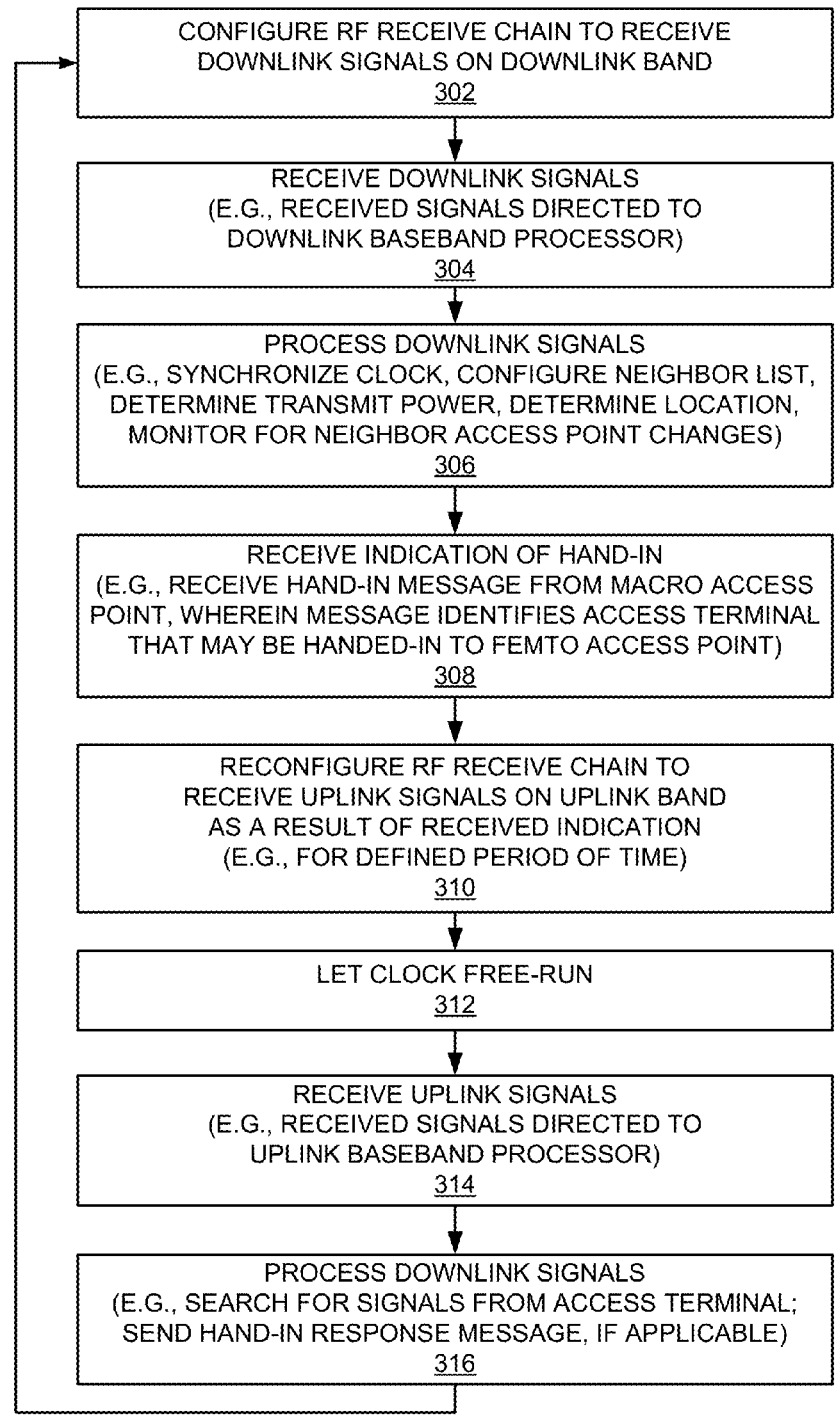
FIG. 3 is a flowchart of several sample aspects of operations that may be performed in conjunction with accomplishing RF receive chain reuse.
Figure 4:
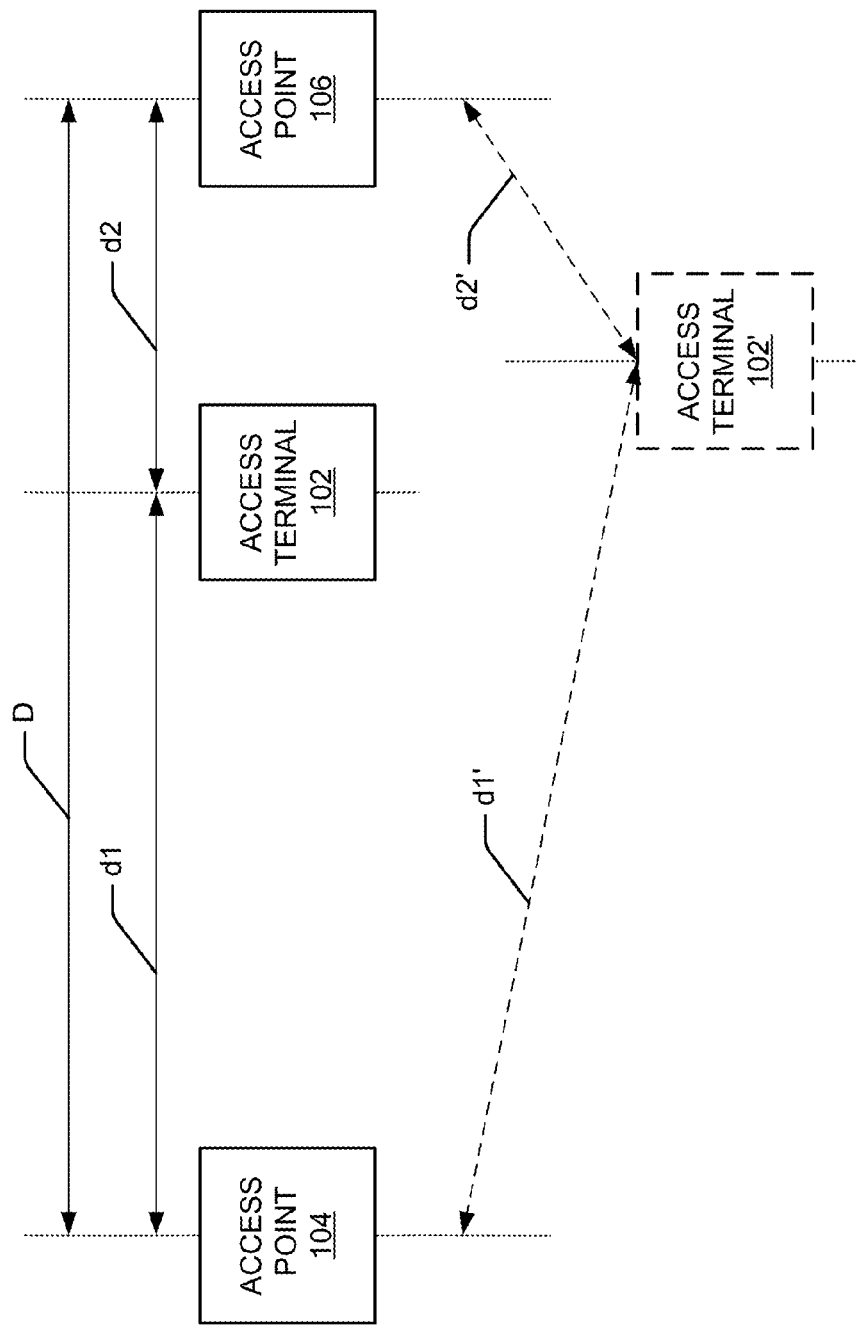
FIG. 4 is a simplified diagram illustrating sample signal propagation geometry.
Figure 5:
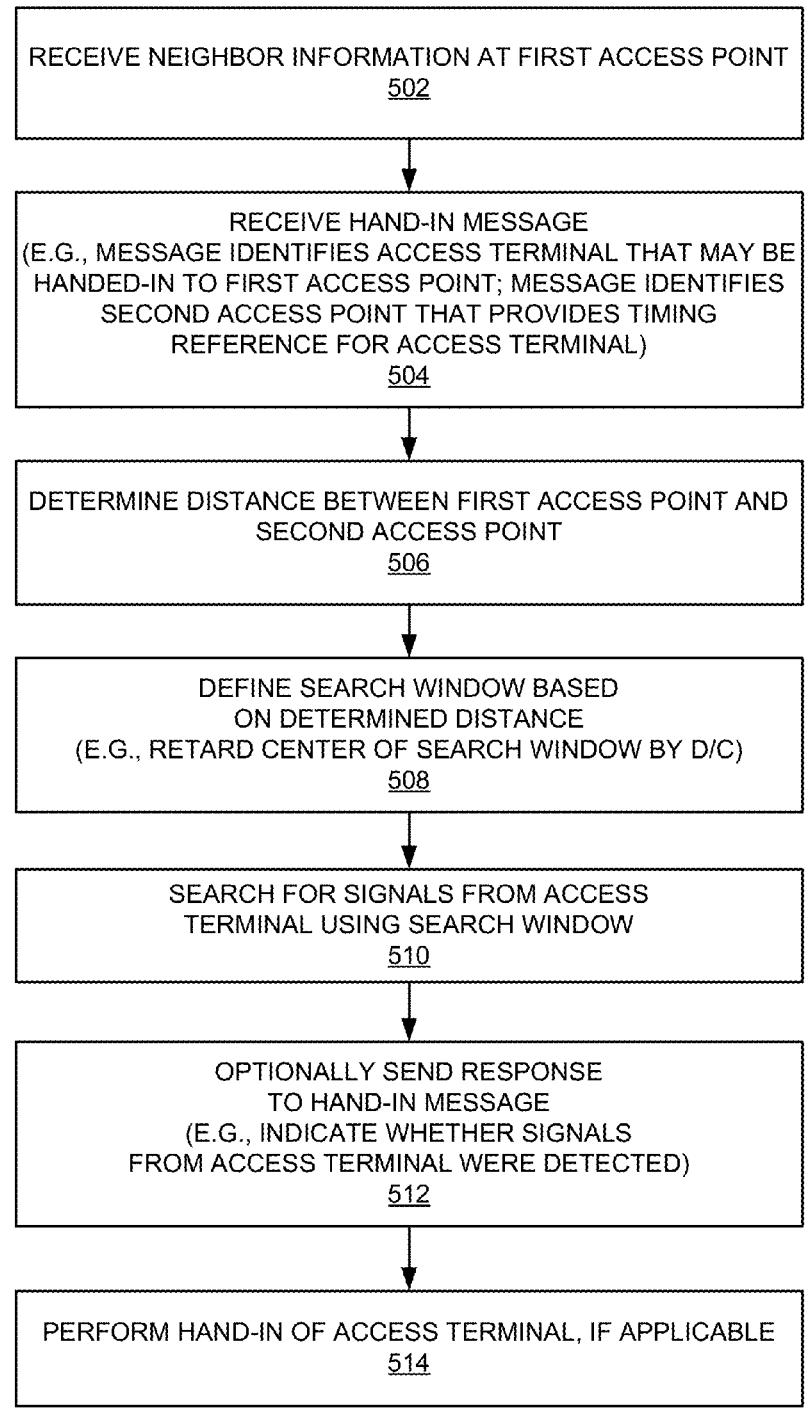
FIG. 5 is a flowchart of several sample aspects of operations that may be performed in conjunction with providing accelerated searching based on a determined distance.
Figure 6:
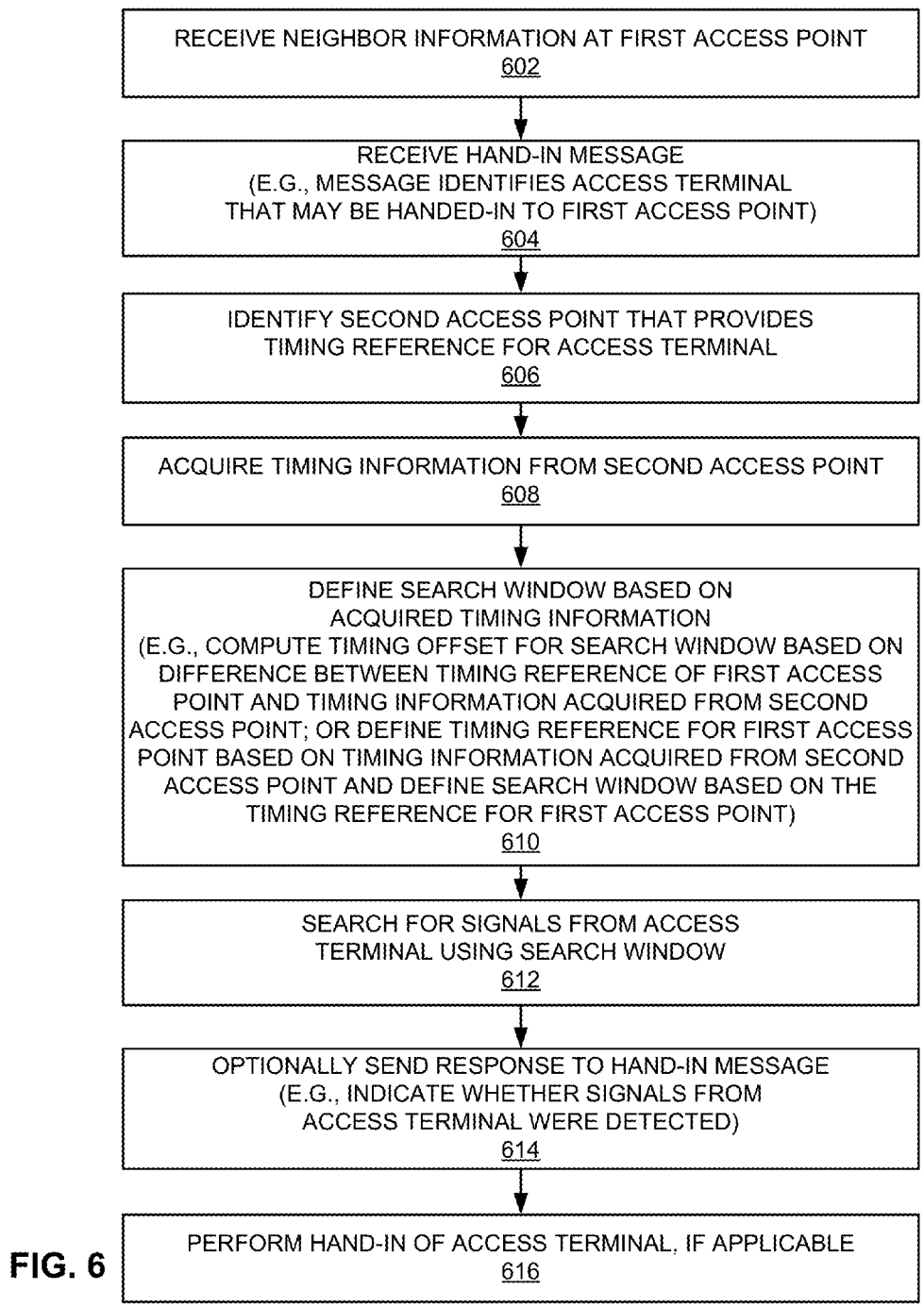
FIG. 6 is a flowchart of several sample aspects of operations that may be performed in conjunction with providing accelerated searching based on acquired timing information.

For illustration purposes, the operations of the flowcharts of FIGS. 3, 5, and 6 (or any other operations discussed or taught herein) may be described as being performed by specific components (e.g., components depicted in FIGS. 1, 2, and 4). It should be appreciated, however, that these operations may be performed by other types of components and may be performed using a different number of components. It also should be appreciated that one or more of the operations described herein may not be employed in a given implementation.

FIG. 2 illustrates sample components that may be employed in an access point (e.g., a femto access point) in conjunction with RF receive chain reuse as taught herein. Here, an RF receive chain 202 is configured at different points in time to receive on a downlink and receive on an uplink. In this example, a hand-in controller 204 controls the reuse of the RF receive chain and controls (via a switching function 206) whether signals output by the RF receive chain 202 are directed to a downlink baseband function 208 or an uplink baseband function 210. Sample operations that may be performed by these components (and, in some implementations, other components of a femto access point) will now be described with reference to the flowchart FIG. 3.

As represented by block 302, the RF receive chain 202 may usually be configured to receive on a downlink band. For example, a downlink band generally comprises a range of frequencies (e.g., sub-bands). Thus, the RF receive chain 202 may be tuned to receive downlink signals on a given frequency (e.g., a sub-band) within the downlink band and remain on that selected frequency. Typically, the selected frequency will be different than the frequency (e.g., a femto channel) used by the femto access point to transmit signals to access terminals that are connected to the femto access point. For example, it may be desirable to select frequencies that are some distance away from one another to reduce adjacent channel interference.

As represented by block 302, the RF receive chain 202 will thus receive downlink signals on the designated downlink frequency. In this configuration, the signals output by the RF receive chain 202 are directed via the switching function 206 to the downlink baseband function 208.

As represented by block 306, the downlink signals are then processed by the downlink baseband function 208. The downlink baseband function 208 may take various forms.

To provide a synchronization function as discussed herein, downlink signals received on a repeated basis may be used to synchronize a clock 212 of the femto access point to the timing of another access point (e.g., a macro access point). To this end, the downlink baseband function 208 may perform operations such as downlink pilot detection and synchronization channel demodulation.

The downlink baseband function 208 may provide other functionality as well. For example, the downlink baseband function 208 may perform certain operations during activation of the femto access point. In some implementations the downlink baseband function 208 may assist in configuring a neighbor list. For example, signals sent by nearby access points may be received by the RF receive chain 202 and processed by the downlink baseband function 208 to discover information about neighbor access points. In some implementations the downlink baseband function 208 may assist in determining transmit power level for the femto access point. For example, received signal power levels detected by the RF receive chain 202 may be used by the downlink baseband function 208 to determine an appropriate (e.g., comparable) transmit power to be used by the femto access point. In this way, the coverage provided by the femto access point may be controlled and optimized for a given environment. In some implementations the downlink baseband function 208 may assist in determining the location of the femto access point. For example, signals received by the RF receive chain 202 may be processed (e.g., using trilateralization or triangulation to process phase information in the signals) by the downlink baseband function 208 to approximate the location of the femto access point. The downlink baseband function 208 also may perform operations after activation of the femto access point. For example, information sent by nearby access points may be received by the RF receive chain 202 and processed by the downlink baseband function 208 to discover information about any changes that may have been made in the network (e.g., deployment of a new macro cell or femto access point).

As represented by block 308, at some point in time, the femto access point will determine that hand-in assistance is required for an approaching access terminal (e.g., upon receiving an indication of hand-in of an access terminal). For example, an access terminal operating on a macro system will send a measurement report (e.g., pilot strength measurement message) to its serving macro access point when the access terminal detects a pilot from the femto access point of sufficient strength. This report may include, for example, an identifier (e.g., a PN offset) of each access point from which the access terminal has received a sufficiently strong signal. In addition, this report may include an indication of the signal strength of that received signal as measured by the access terminal. In the event a particular signal is determined to be dominant (e.g., the received signal strength of the signal is greater than the received signal strength of a signal received from the serving access point by a defined margin), the macro system may elect to hand-in the access terminal to the access point that is transmitting the dominant signal. As discussed herein, in some instances, the dominant signal may be associated with the same identifier that is assigned to several other femto access points. Consequently, while the occurrence of hand-in at any given femto access point may be rare, due to identifier (e.g., PN offset) reuse, many candidate target access points may requested to assist in identifying the intended target access point for hand-in of the access terminal. Consequently, the femto access point may receive a message (e.g., a hand-in message) from a source access point that indicates that the femto access point is a candidate target for hand-in of an access terminal. This message may include an identifier associated with the access terminal that will enable the femto access point to identify signals transmitted by the access terminal. This identifier may take various forms. For example, the identifier may comprise an uplink long code (also known under various other names such as a reverse link long code, RLLC) or uplink scrambling code.

As represented by block 310, in the event an indication of hand-in is received, the hand-in controller 204 may reconfigure the RF receive chain 202 to receive on an uplink band. This reconfiguration may be accomplished, for example, by sending an appropriate control signal (e.g., uplink/downlink control) to the RF receive chain 202. An uplink band generally comprises a range of frequencies (e.g., sub-bands). Thus, the RF receive chain 202 may be tuned to receive uplink signals on the frequency (e.g., a sub-band) within the uplink band on which the access terminal to potentially be handed-in is transmitting.

Note, however, in those instances where the frequency being used by the access terminal is the same as the frequency (e.g., a femto channel) used by the femto access point to receive signals from access terminals that are connected to the femto access point, the main receiver (not shown in FIG. 2) of the femto access point may be used for hand-in assistance. Thus, in these instances, the RF receive chain 202 may not be used for hand-in assistance.

As represented by block 312, in the event reuse of the RF receive chain 202 is required, the clock 212 is allowed to free-run during the hand-in assistance period. However, timing performance may not be significantly affected by this temporary free-running mode since the hand-in assistance period may a relatively short (e.g., less than 100 milliseconds) and generally occurs only sporadically.

In some aspects, the maximum length of time that may be allowed for clock free-run may depend on oscillator quality (e.g., stability) and the synchronization tolerance in the wireless network. An example where a free-running clock error=$10^7$ is assumed follows. Timing drift in 1 second for a baseband rate of 1.2288 Mchips=0.123 chips. Thus, the timing drift in 100 milliseconds is approximately 0.01 micro seconds (0.123 chips*0.08 microseconds per chip). This amount of drift may be well within the synchronization tolerance of some networks (e.g., 3 microseconds in a CDMA 2000 system).

As represented by block 314, during the hand-in assistance period, the RF receive chain 202 will receive uplink signals on the designated uplink frequency. Here, the hand-in controller 204 causes the signals output by the RF receive chain 202 to be directed to the uplink baseband function 210. This may be accomplished, for example, by sending an appropriate control signal (e.g., receive output control) to the switching function 206.

As represented by block 316, the uplink signals are thus processed by the uplink baseband function 210. The uplink baseband function 208 may take various forms. As discussed herein, a hand-in assist search function 214 may be employed to search for uplink signals from an access terminal that may be handed-in to the access point. Thus, the uplink baseband function 210 may involve performing operations such as searching for (over a search window) and detecting signals broadcast by the access terminal (e.g., signals scrambled using the indicated reverse link long code) and measuring received signal strength (e.g., RSSI).

In some cases, the femto access point may send a hand-in response based on the results of the search and/or detection operations. For example, the femto access point may send a message to the source access point that indicates whether the femto access point detected signals from the designated access point and the received signal strength of those signals. Thus, based on this information, the source access point may determine whether the femto access point is the intended target for the hand-in. If so, the appropriate hand-in operations may be performed to accomplish this hand-in.

Upon termination of the hand-in assistance operation (e.g., upon completion of search and detection operations or upon expiration of a designated period of time), the RF receive chain 202 is reconfigured to receive on a downlink band. Thus, clock synchronization operations and other downlink operations may be resumed and continued until the next time hand-in assistance is required. As discussed above, the reconfiguration of the RF receive chain 202 may be accomplished for example, by sending an appropriate command from the hand-in controller 204 to the RF receive chain 202.

It should be appreciated that FIG. 2 depicts but one example of how reuse may be accomplished in accordance with the teachings herein and that other schemes may be used in various implementations. For example, different criteria may be employed to determine when to reconfigure the RF receive chain (e.g., a different type of controller may be used in place of the controller 204). In addition, different functionality may use the signals from the RF receive chain (e.g., different types of processes or components may be used in place of the functions 208 and 210). Furthermore, a different number of reuse functions (i.e., more than two) may be employed.

An RF receive chain (e.g., an RF receiver) may take various forms. In some implementations an RF receive chain consists of analog components that are used to receive RF signals. In some implementations an RF receive chain also may include digital components that are used to provide data (e.g., digital data signals) representative of the received signals.

The reconfiguration of a RF receive chain may be accomplished in various ways. For example, in some implementations a control signal may be sent to the RF receive chain to direct the RF receive chain to reconfigure itself to receive on the downlink or the uplink. In some implementations, registers in the RF receive chain may be configured to specify the appropriate RF receive chain functionality. For example, this may involve adjusting a tuner, specifying the frequency sub-bands to be monitored (e.g., by specifying filter parameters), specifying gains to be used, and specifying other receiver parameters.

Also, a switching function may be achieved in various ways. For example, in some implementations this may involve physically switching signals to different components (e.g., enabling or disabling the coupling of a signal to the synchronized clock). In addition, in some implementations this may involve routing signals to an appropriate process (e.g., executed by a baseband processor that performs downlink and uplink baseband processes).

In some aspects, it is desirable to reduce the search window that an access point uses to identify signals transmitted by an access terminal. For example, in the scheme of FIG. 2, it may be desirable to keep the hand-in assistance time as short as possible to reduce the amount of time the clock is free-running. In addition, if a large number of femto access points under a given macro access point are assigned the same identifier, or if the femto access point is located in an area with significant traffic (e.g., in a hot spot frequented by cell phone users, such as a coffee shot), it may be desirable to keep the search time as short as possible so that these femto access points may be able to handle, for example, a large number of hand-in evaluation requests and/or nearly simultaneous hand-in evaluation requests.

FIG. 4 illustrates sample distance relationships that affect the size of a search window that may be employed by an access point. In FIG. 4 the access points 104 and 106 are separated by a distance D and the access terminal 102 may be located anywhere in a three-dimensional space in the vicinity about the access points 104 and 106. For purposes of discussion, however, it is initially assumed that the access terminal 102 lies somewhere along an imaginary straight line between the access points 104 and 106. Hence, the sum of the distance d1 (between the access point 104 and the access terminal 102) and the distance d2 (between the access point 106 and the access terminal 102) is equal to D.

Under certain conditions (e.g., when the access terminal 102 is being served by the access point 104), the access terminal 102 receives timing signals from the access point 104. Due to signal propagation delay, however, the time reference at the access terminal 102 may be different than the time reference at the access point 104. Specifically, the time at the access terminal 102 will lag the time at the access point 104, and will be approximately: t−d1/c, where t is the time at the access point 104 and c is the speed of light.

Also due to signal propagation delay, the time at which the access terminal 102 receives a pilot signal from the access point 106 will lag the time at which the access point 106 transmitted the pilot signal by approximately: d2/c. Here it is assumed that the time t is approximately the time at the access point 106 (which may be synchronized with the time at the access point 104, within a certain tolerance). Thus, from the perspective of the time reference at the access terminal 102, the pilot signal from the access point 106 is received at the access terminal 102 delayed by a phase "lag" of: (d2−d1)/c.

Note that the "lag" in this equation may be positive or negative depending on whether d1 is smaller than d2, or vice versa. It should be appreciated that the maximum phase lag here is D/c, since d2−d1 can never exceed D. It should also be appreciated that this phase lag relationship holds even when the access terminal is not located along a straight line connecting the access points 104 and 106. That is, for the access terminal 102' shown in phantom, the phase lag is (d2'−d1')/c and the maximum possible phase lag is still D/c.

The signal propagation geometry principles discussed above for downlink signals (e.g., pilot signals) also apply in some aspects to a search window used by an access point for detecting signals from an access terminal. In general, the search window is dependent on the size of the coverage area provided by an access point. For example, if the access point 106 provides coverage over a very large area, the width of the search window that the access point 106 may use to search for signals from the access terminal 102 may be defined equal to the maximum possible phase lag (e.g., D/c). In contrast, a smaller width search window may be provided in the case where the access point 106 provides relatively small area coverage. Here, a smaller sized search window may be used because the search window does not need to account for scenarios where the access terminal 102 is not relatively close to the access point 106. In other words, the access point 106 will not receive uplink signals of sufficient strength from the access terminal 102 when the access terminal 102 is far away from the access point 106. Consequently, the size of the search window may be reduced to avoid searching in the phase space where the access point 106 would not be receiving a signal from the access terminal 102. Thus, in accordance with the teaching herein, a smaller search window may be used to provide accelerated searching for hand-in assistance at the access point 106.

FIGS. 5 and 6 describe two schemes that may be used to provide shorter search times at an access point that provides relatively small coverage. In these examples, it is assumed that the access terminal transmit timing is synchronized to network system time, as derived from a downlink signal received from the access point 104 (e.g., the current serving access point for the access terminal 102). Here, system time is adjusted upon handoff in a smooth fashion. In addition, transmit timing and receive timing are mutually synchronized by the access terminal.

FIG. 5 describes a scheme where the distance between access points is used to define a search window (e.g., to specify the appropriate timing for the center of the search window). For example, when an access terminal is near a femto access point, the search geometry may be simplified since d1 is approximately equal to the distance D, the distance between the femto access point and the macro access point that provides the timing reference for the access terminal. Here, the femto access point may determine the value of D (e.g., as discussed below). Thus, the femto access point may derive the approximate time reference as seen by the access terminal: $t - d1/C \approx t - D/C$. Again, t is the time at the macro access point (which may also be equal to the time at the femto access point). Propagation delay from the access terminal to the femto access point (d2/c) is very small when the access terminal is close to the femto access point (e.g., sufficiently close for the access terminal to detect the pilot signal from the femto access point and trigger hand-in). Thus, the femto access point may define (e.g., adjust) the search window by retarding its center by D/c from its own time reference and reduce the width of the search window.

In some aspects, the width of the search window may be based on the synchronization tolerance of the associated synchronized wireless network. For example, the width of the search window may be defined to be less than or equal to 3 microseconds.

As discussed herein, in some aspects, the width of the search window may be defined based on the wireless coverage area of the corresponding access point (e.g., the femto access point in this example). In particular, a narrow search window may be employed when this access point has a relatively "small" coverage area (e.g., a diameter of less than 100 meters). In some aspects, a "small" coverage area may be defined relative to the coverage area of the access point that is currently providing the timing reference for the access terminal. For example, a narrower search window may be employed when the wireless coverage area of the access point is at least an order of magnitude smaller than the wireless coverage area of the access point that provides the timing reference (e.g., a macro access point having a coverage area diameter of greater than 1 kilometer).

In the scheme of FIG. 5, if a femto access point is not the intended hand-in target, it is unlikely that the femto access will detect the access terminal. For example, the signal from the access terminal as received at the femto access point would likely be too weak for detection. In addition, if the femto hand-in assist receiver searches over the reduced window, the access terminal transmission timing will likely be outside of the search window used by the femto access point.

Referring now to the operations of FIG. 5, as represented by block 502, a first access point (e.g., access point 106) may obtain information about its neighbor access points at various points in time (e.g., during neighbor relations/discovery operations). For example, the first access point may acquire location information (e.g., the location of the access point 104) that enables the first access point to determine the distance between itself and any of its neighbor access points.

As represented by block 504, at some point in time, the first access point receives a hand-in message that results in the first access point providing hand-in assistance as discussed herein. As discussed above, the hand-in message may be triggered by the access terminal sending a measurement report (e.g., PSMM). In addition, the measurement report may identify the access point (e.g., macro access point) that provides the timing reference for the access terminal. Thus, the first access point may receive a hand-in message that includes an identifier (e.g., RLLC) associated with the access terminal to be handed-in (e.g., access terminal 102). In addition, the hand-in message may indicate that a second access point (e.g., access point 104) provides a timing reference for the access terminal (e.g., identifies the access point that the access terminal timing is synchronized to).

As represented by block 506, the first access point determines the distance between itself and the second access point. For example, in a case where the first access point has multiple macro access point neighbors, the first access point may identify the access point that is used by the access terminal for timing reference derivation based on an indication provided by the hand-in message as discussed above. The first access point may then use information acquired at block 502 or in some other manner (e.g., database lookup) regarding the location of the second access point (a neighbor of the first access point) and information the first access point acquires regarding its own location (e.g., as measured at the first access point using GPS or macro signals or as programmed by a user of the first access point) to calculate the distance D.

As represented by block 508, the first access point defines the search window based on the determined distance. For example, the first access point may define the timing for the center of the search window by retarding the center of the search window by D/c (e.g., provide an offset with respect to the timing reference of the first access point). In addition, as discussed herein, a relatively small width (e.g., less than 3 microseconds) may be defined for the search window based on synchronization error tolerance and/or the small coverage area of the first access point.

As represented by block 510, the first access point conducts a search for signals from the access terminal identified at block 504 using the search window defined at block 508. As discussed herein, this may involve search, detection, and received signal strength measurement operations.

As represented by block 512, the first access point may send a hand-in response based on the result of the search and detection operations. For example, the first access point may send a message to the source access point that indicates whether the first access point detected signals from the designated access terminal and indicates the received signal strength of those signals. Thus, based on this information, the source access point may determine whether the first access point is the intended target for the hand-in. If so, the appropriate hand-in operations may be performed to accomplish this hand-in (block 514).

Referring now to FIG. 6, this flowchart describes a scheme where a first access point (e.g., access point 106) receives timing information from a second access point (e.g., access point 104), whereby the search window is defined based on this timing information. Advantageously, the width of the search window may be further reduced through the use of such a scheme. Here, the first access point is allowed to calibrate systematic synchronization error between the access points. In some aspects, the actual time offset (not computed from D) may be measured by a downlink receiver of the first access point. In some aspects, the timing for the first access point is derived from the second access point. In this case, there is no synchronization error. In some aspects, drift error may be nulled by tracking the drift error using the downlink receiver. The first access point may center the search window around this calibrated value of timing offset, thereby potentially drastically reducing the search effort. An example follows. The searcher works by making a hypothesis about received signal timing, integrating received signal energy for a signal segment, and shifting the timing hypothesis to repeat the signal energy integration. This is repeated over the entire search window. The correct timing corresponds to the peak of the integrated energy. It is assumed that a calibrated hand-in time reference has uncertainty of: 2*chip time=1.6 microseconds. One half of a chip time (0.4 microseconds) is used for the hypothesis increment. Thus, the search effort is reduced to the total of 4 hypotheses. In contrast, a macro access point search window of 40 chips may yield 80 hypotheses.

Referring now to the operations of FIG. 6, as represented by block 602, the first access point may obtain information about its neighbor access points (e.g., as discussed above at block 502).

As represented by block 604, at some point in time, the first access point receives a hand-in message that results in the first access point providing hand-in assistance as discussed herein. As discussed above at block 504, the first access point may receive a hand-in message that includes an identifier (e.g., RLLC) associated with the access terminal to be handed-in and an indication that a second access point provides a timing reference for the access terminal.

As represented by block 606, the first access point identifies the access point (e.g., the second access point) that provides the timing reference for the access terminal to be handed-in. For example, as discussed above at block 504, the first access point may receive an indication via the hand-in message that indicates that the second access point provides the timing reference for the access terminal.

As represented by block 608, the first access point acquires timing information from the second access point. For example, a downlink receiver at the first access point (e.g., a dedicated or reused RF receive chain as discussed herein) may monitor the downlink for signals containing timing information from the second access point.

As represented by block 610, the first access point defines the search window based on the acquired timing information. For example, as discussed above, the first access point may determine the timing offset for the search window (e.g., for the center of the search window) based on the difference between timing at the first access point and the timing indicated by the signals acquired from the second access point. Alternatively, the first access point may synchronize its timing with the timing indicated by the signals acquired from the second access point. In this case, the first access point may define the search window (e.g., the center of the search window) based on the synchronized timing (e.g., with no offset since there is no synchronization error).

As represented by block 612, the first access point conducts a search for signals from the access terminal identified at block 604 using the search window defined at block 610. As discussed herein, this may involve search, detection, and received signal strength measurement operations.

As represented by block 614, the first access point may send a hand-in response based on the result of the search and detection operations. For example, the first access point may send a message to the source access point that indicates whether the first access point detected signals from the designated access terminal and indicates the received signal strength of those signals. Thus, based on this information, the source access point may determine whether the first access point is the intended target for the hand-in. If so, the appropriate hand-in operations may be performed to accomplish this hand-in (block 616).

Various advantages may be achieved through the use of an accelerated search scheme as taught herein. For example, in some aspects, a femto access point receiver (e.g., an uplink receiver) may drastically reduce search effort to detect an approaching access terminal about to hand-in. In some aspects, a femto access point receiver that is requested to conduct multiple uplink detections while resolving access point identifier (e.g., PN offset) ambiguity, may do so using a single receiver element (e.g., RF receive chain). Here, each access point identifier resolution attempt may occupy the femto access point receiver for a relatively brief period of time. Thus, such schemes may be employed as part of a cost effective and scalable way to implement macro-to-femto hand-in without radio interface changes. Moreover, such schemes may be applied to asynchronous systems (e.g., wideband CDMA), since clock drift may be calibrated by the femto access point receiver.

Figure 7:
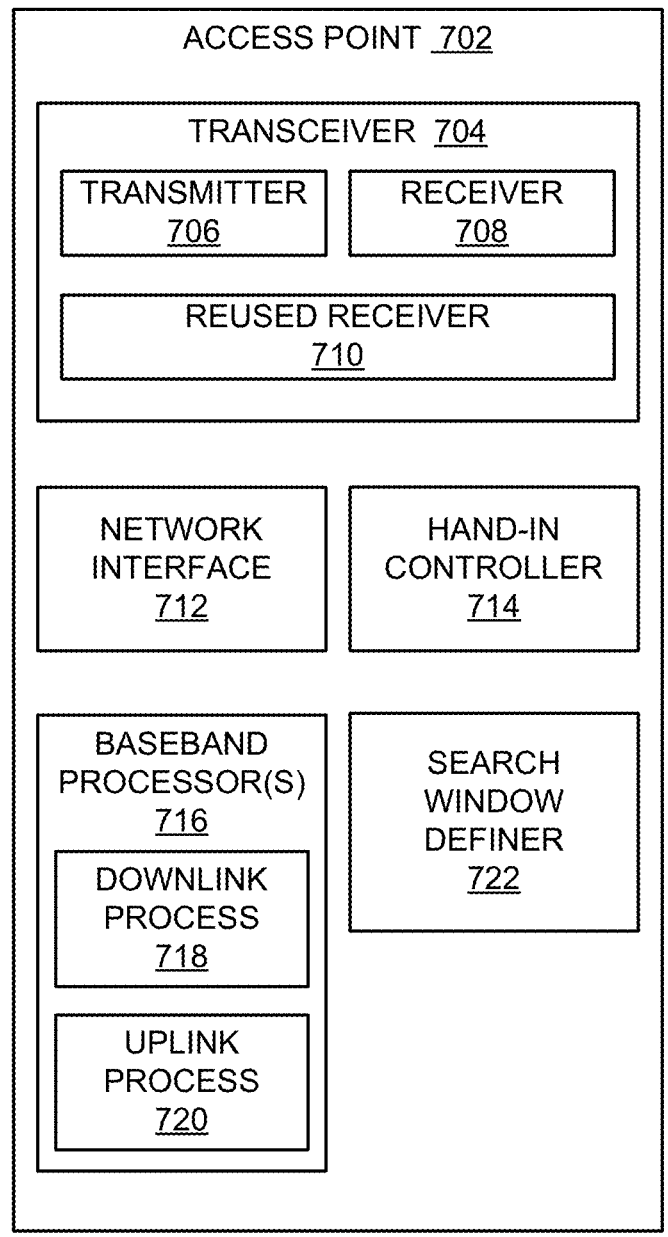
FIG. 7 is a simplified block diagram of several sample aspects of components that may be employed in communication nodes.

FIG. 7 illustrates several sample components that may be incorporated into a node such as access point 702 (e.g., corresponding to the access point 106) to perform operations as taught herein. The described components also may be incorporated into other nodes in a communication system. For example, other nodes in a system may include components similar to those described for the access point 702 to provide similar functionality. A given node may contain one or more of the described components. For example, an access point may contain multiple transceiver components that enable the access point to operate on multiple frequencies and/or communicate via different technologies.

As shown in FIG. 7, the access point 702 includes a transceiver 704 for communicating with other nodes. The transceiver 704 includes a transmitter 706 for sending signals (e.g., messages) and a receiver 708 for receiving signals. For example, these components may be used to communicate with nearby access terminals (not shown in FIG. 7). In addition, the transceiver 704 includes another receiver 710 for receiving signals. For example, the receiver 710 (e.g., an RF receive chain) may be reused to receive downlink signals and uplink signals at different times as taught herein.

The access point 702 also may include a network interface 712 for communicating with other network nodes (e.g., for transmitting and receiving messages). For example, the network interface 712 may be configured to communicate with one or more network nodes via a wired or wireless backhaul.

The access point 702 also includes other components that may be used in conjunction with the operations as taught herein. For example, the access point 702 may include a hand-in controller 714 for performing hand-in-related operations (e.g., reconfiguring an RF receive chain, sending a message that indicates whether an access terminal should be handed-in) and for providing other related functionality as taught herein. The access point 702 may include one or more baseband processors 716 for performing baseband-related operations (e.g., processing uplink and/or downlink signals) and for providing other related functionality as taught herein. In some implementations, a single baseband processor may be use to perform a downlink process 718 (e.g., process received downlink signals) and an uplink process 720 (e.g., process received uplink signals). In other implementations, separate baseband processors may be used to perform the downlink process 718 and the uplink process 720. The access point 702 also may include a search window definer for defining a search window (e.g., determining a distance between access points and defining a search window based on the determined distance; identifying an access point that provides a timing reference, acquiring timing information from the identified access point, and defining a search window based on the acquired timing information) and for providing other related functionality as taught herein.

For convenience, the access point 702 is shown in FIG. 7 as including components that may be used in the various examples described herein. In practice, one or more of the illustrated components may not be used in a given implementation. As an example, in some implementations the access point 702 may not comprise the search window definer 722. Also, one or more of the illustrated components may provide different functionality in different implementations. For example, in some implementations the search window definer 722 may perform operations as described in FIG. 5 and in some implementations the search window definer 722 may perform operations as described in FIG. 6.

Furthermore, in some implementations the components of FIG. 7 may be implemented in one or more processors (e.g., that uses and/or incorporates data memory for storing information or code used by the processor(s) to provide this functionality). For example, the functionality of blocks 712-722 may be implemented by a processor or processors of an access point and data memory of the access point (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 8:
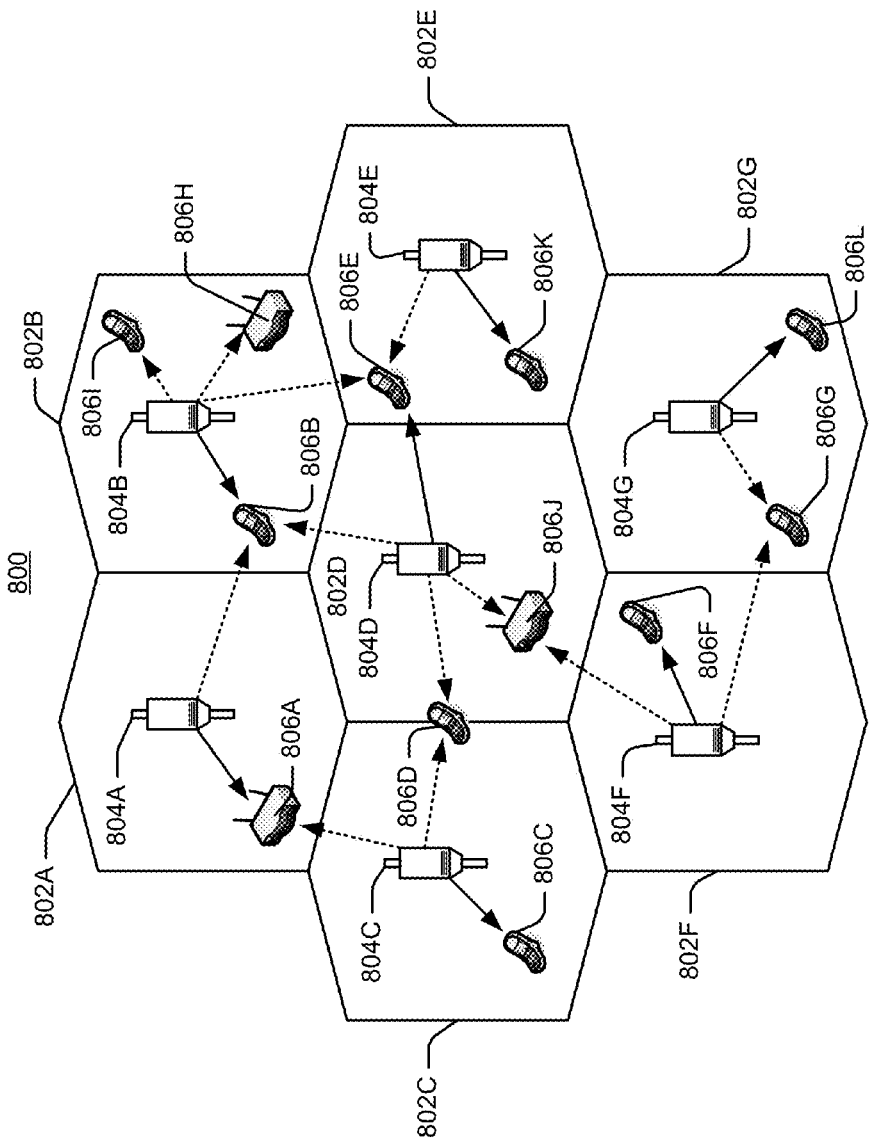
FIG. 8 is a simplified diagram of a wireless communication system.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G). As shown in FIG. 8, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in rural environment.

Figure 9:
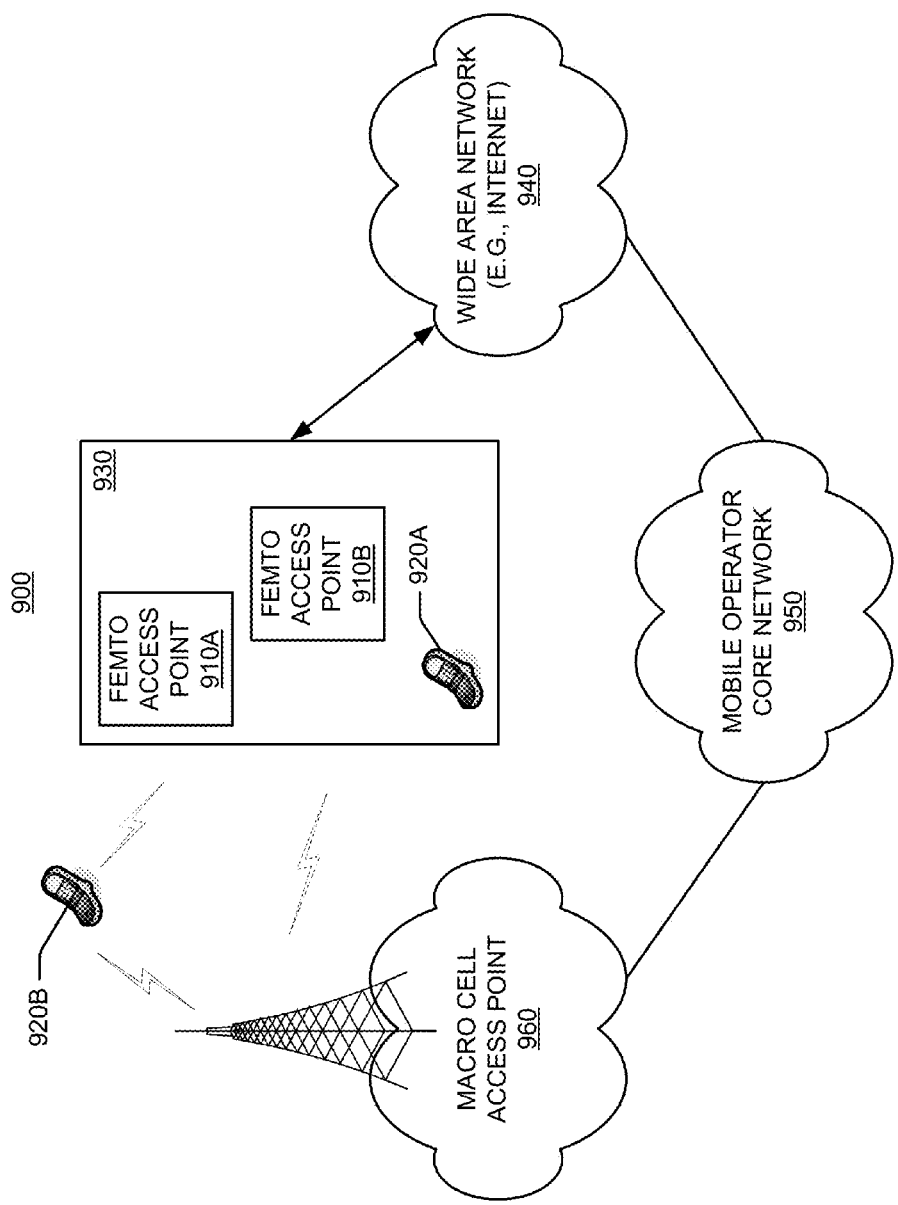
FIG. 9 is a simplified diagram of a wireless communication system including femto nodes.

FIG. 9 illustrates an exemplary communication system 900 where one or more femto access points are deployed within a network environment. Specifically, the system 900 includes multiple femto access points 910 (e.g., femto access points 910A and 910B) installed in a relatively small scale network environment (e.g., in one or more user residences 930). Each femto access point 910 may be coupled to a wide area network 940 (e.g., the Internet) and a mobile operator core network 950 via a DSL router, a cable modem, a wireless link, or other connectivity means (not shown). As will be discussed below, each femto access point 910 may be configured to serve associated access terminals 920 (e.g., access terminal 920A) and, optionally, other (e.g., hybrid or alien) access terminals 920 (e.g., access terminal 920B). In other words, access to femto access points 910 may be restricted whereby a given access terminal 920 may be served by a set of designated (e.g., home) femto access point(s) 910 but may not be served by any non-designated femto access points 910 (e.g., a neighbor's femto access point 910).

Figure 10:
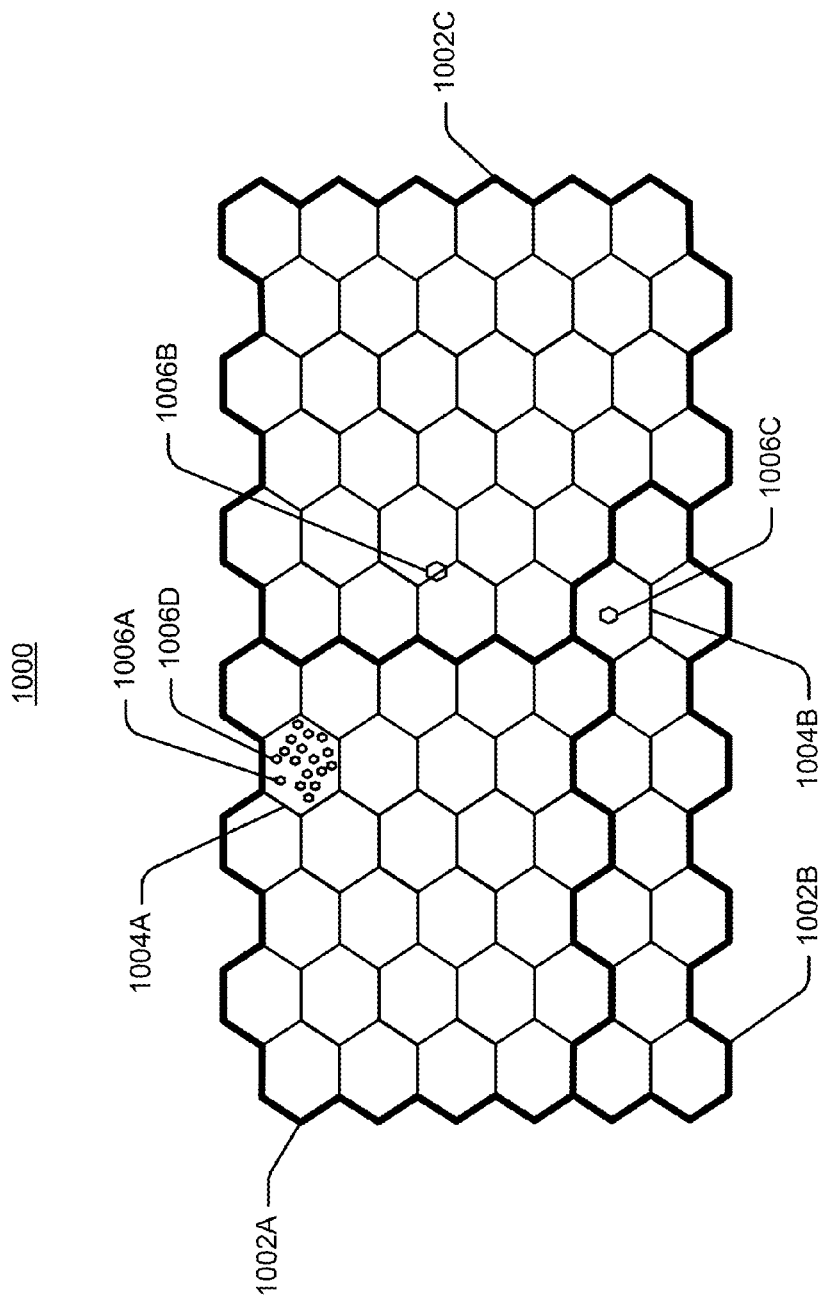
FIG. 10 is a simplified diagram illustrating coverage areas for wireless communication.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include femto coverage areas 1006. In this example, each of the femto coverage areas 1006 (e.g., femto coverage areas 1006B and 1006C) is depicted within one or more macro coverage areas 1004 (e.g., macro coverage areas 1004A and 1004B). It should be appreciated, however, that some or all of a femto coverage area 1006 may not lie within a macro coverage area 1004. In practice, a large number of femto coverage areas 1006 (e.g., femto coverage areas 1006A and 1006D) may be defined within a given tracking area 1002 or macro coverage area 1004. Also, one or more pico coverage areas (not shown) may be defined within a given tracking area 1002 or macro coverage area 1004.

Referring again to FIG. 9, the owner of a femto access point 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of femto access points 910 (e.g., the femto access points 910A and 910B that reside within a corresponding user residence 930). For example, when a subscriber is outside his home, he is served by a standard macro access point (e.g., access point 960) and when the subscriber is at home, he is served by a femto access point (e.g., access point 910A). Here, a femto access point 910 may be backward compatible with legacy access terminals 920.

A femto access point 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred femto access point (e.g., the home femto access point of the access terminal 920) whenever such connectivity is possible. For example, whenever the access terminal 920A is within the user's residence 930, it may be desired that the access terminal 920A communicate only with the home femto access point 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred femto access point 910) using a better system reselection (BSR) procedure, which may involve a periodic scanning of available systems to determine whether better systems are currently available and subsequently acquire such preferred systems. The access terminal 920 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 910, the access terminal 920 selects the femto access point 910 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 910 that reside within the corresponding user residence 930). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals.

Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
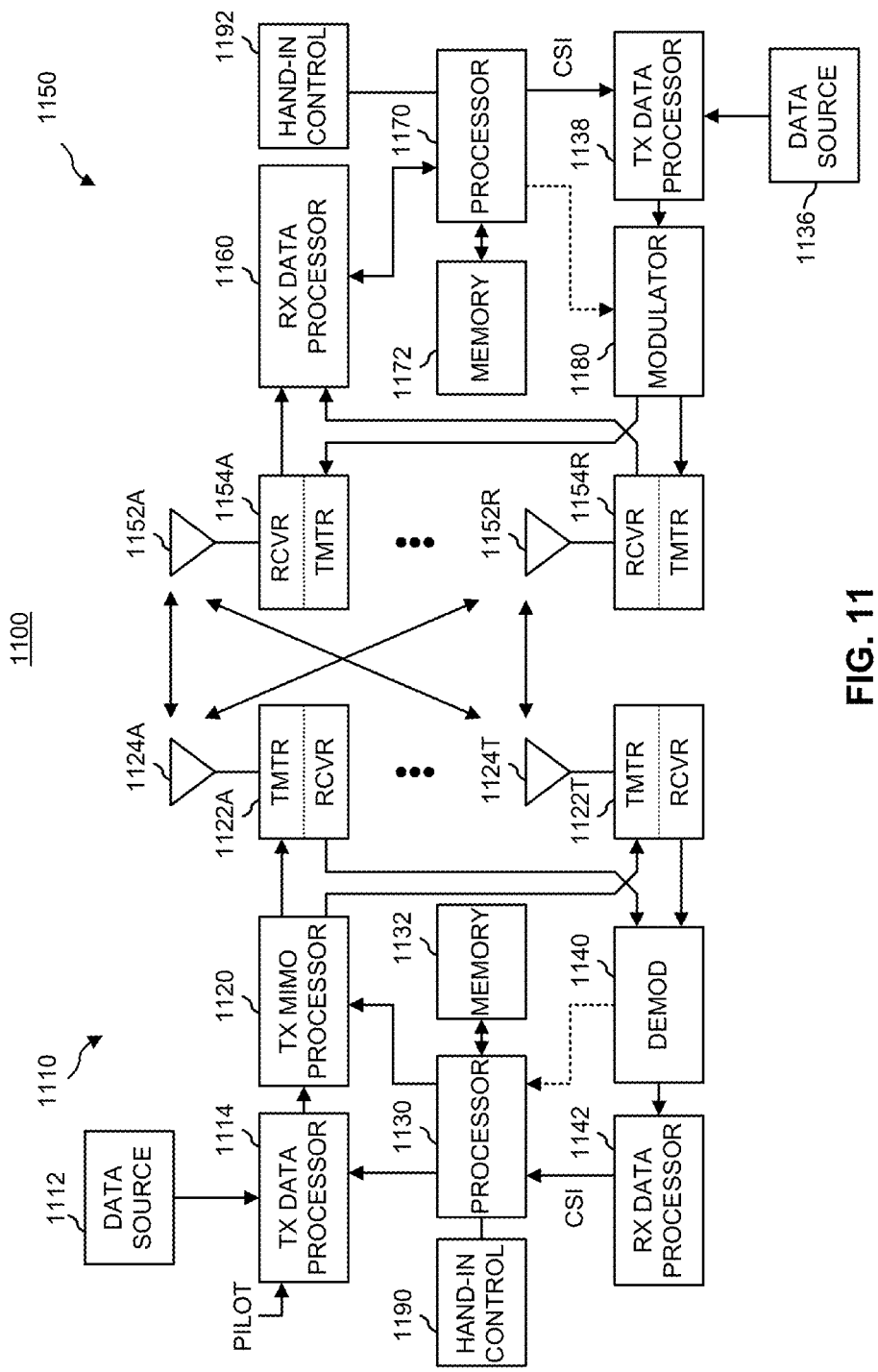
FIG. 11 is a simplified block diagram of several sample aspects of communication components.

FIG. 11 illustrates a wireless device 1110 (e.g., an access point) and a wireless device 1150 (e.g., an access terminal) of a sample MIMO system 1100. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform hand-in control operations as taught herein. For example, a hand-in control component 1190 may cooperate with the processor 1130 and/or other components of the device 1110 to hand-in another device (e.g., device 1150) as taught herein. Similarly, a hand-in control component 1192 may cooperate with the processor 1170 and/or other components of the device 1150 to perform hand-in to another device (e.g., device 1110). It should be appreciated that for each device 1110 and 1150 the functionality of two or more of the described components may be provided by a single component. For example, a single processing component may provide the functionality of the hand-in control component 1190 and the processor 1130 and a single processing component may provide the functionality of the hand-in control component 1192 and the processor 1170.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 12:
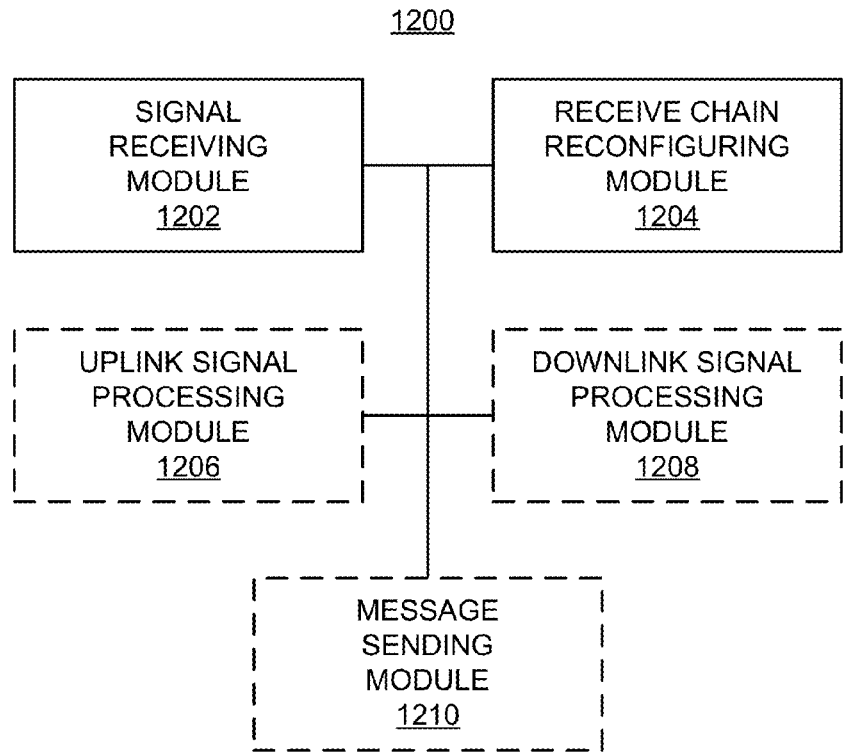
FIGS. 12-14 are simplified block diagrams of several sample aspects of apparatuses adapted to provide RF receive chain reuse and/or provide accelerated searching as taught herein.
Figure 13:
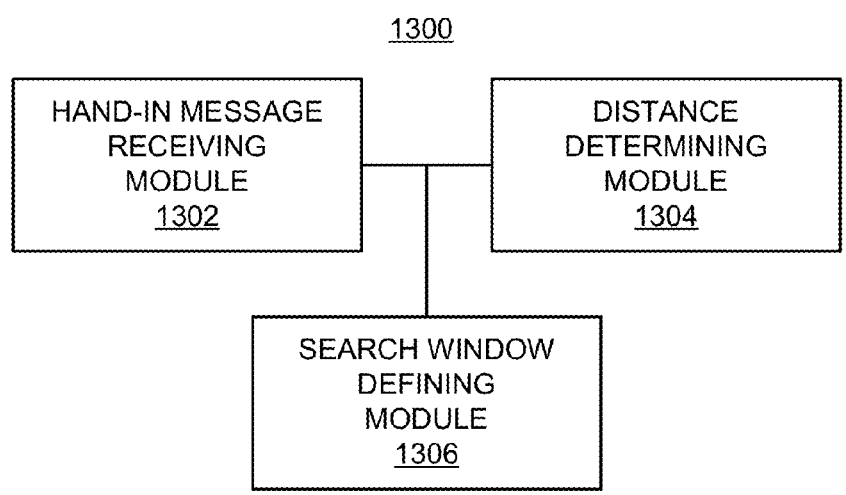
Figure 14:
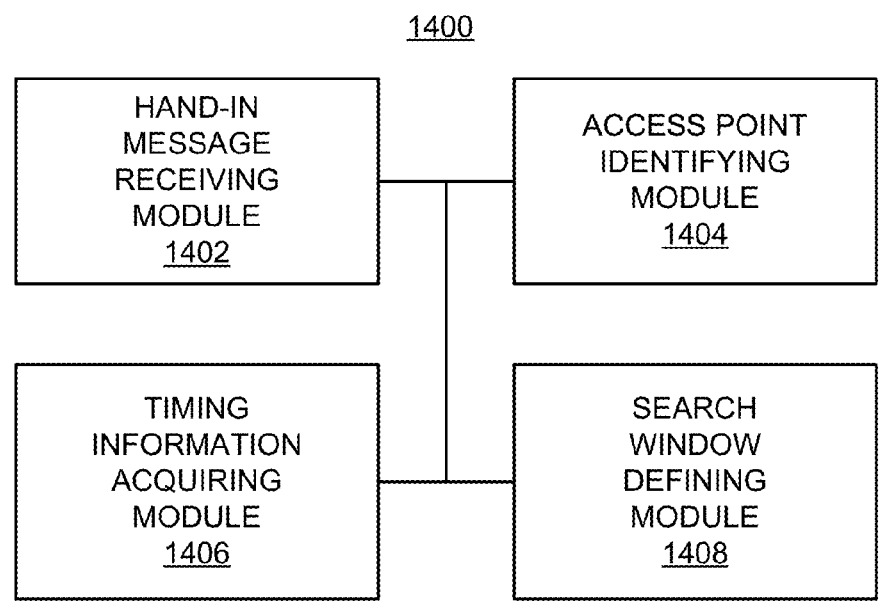

The functionality described herein (e.g., with regard to one or more of the accompanying figures) may correspond in some aspects to similarly designated "means for" functionality in the appended claims. Referring to FIGS. 12-14, apparatuses 1200, 1300, and 1400 are represented as a series of interrelated functional modules. Here, a signal receiving module 1202 may correspond at least in some aspects to, for example, an RF receiver as discussed herein. A receive chain reconfiguring module 1204 may correspond at least in some aspects to, for example, a hand-in controller as discussed herein. An uplink signal processing module 1206 may correspond at least in some aspects to, for example, a baseband processor as discussed herein. A downlink signal processing module 1208 may correspond at least in some aspects to, for example, a baseband processor as discussed herein. A message sending module 1210 may correspond at least in some aspects to, for example, a hand-in controller as discussed herein. A hand-in message receiving module 1302 may correspond at least in some aspects to, for example, a network interface as discussed herein. A distance determining module 1304 may correspond at least in some aspects to, for example, a search window definer as discussed herein. A search window defining module 1306 may correspond at least in some aspects to, for example, a search window definer as discussed herein. A hand-in message receiving module 1402 may correspond at least in some aspects to, for example, a network interface as discussed herein. An access point identifying module 1404 may correspond at least in some aspects to, for example, a search window definer as discussed herein. A timing information acquiring module 1406 may correspond at least in some aspects to, for example, a search window definer as discussed herein. A search window defining module 1408 may correspond at least in some aspects to, for example, a search window definer as discussed herein.

The functionality of the modules of FIGS. 12-14 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 12-14 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving downlink signals on a downlink band at a radio frequency receive chain of a first access point;

reconfiguring the radio frequency receive chain to receive on an uplink band temporarily for a defined period of time as a result of receiving an indication of hand-in from a second access point;

receiving uplink signals on the uplink band at the radio frequency receive chain as a result of the reconfiguration; and reconfiguring the radio frequency receive chain to receive on the downlink band upon expiration of the defined period of time.

2. The method of claim 1, further comprising:

processing the received uplink signals to search for signals from an access terminal identified by the indication of hand-in; and processing the received downlink signals to synchronize a clock, wherein the clock is configured to free-run if the radio frequency receive chain is receiving uplink signals.

3. The method of claim 2, further comprising sending a message to the second access point if signals from the access terminal are detected as a result of the processing of the received uplink signals, wherein the message indicates whether the access terminal should be handed-in to the first access point.

4. The method of claim 2, further comprising processing the received downlink signals to perform at least one of the group consisting of: configuring a neighbor list, determining transmit power for the first access point, determining a location of the first access point, and monitoring for changes relating to neighbor macro access points.

5. The method of claim 1, wherein the defined period of time is based on one of:

a distance between the first access point and the second access point, or a calibration of synchronization error between the first access point and the second access point.

6. The method of claim 5, wherein the defined period of time is less than 100 milliseconds.

7. The method of claim 1, wherein:

signals output by the radio frequency receive chain are directed to a receive synchronization baseband function if the radio frequency receive chain is receiving downlink signals; and signals output by the radio frequency receive chain are directed to a hand-in assist baseband function if the radio frequency receive chain is receiving uplink signals.

8. The method of claim 7, wherein:

the receive synchronization baseband function comprises downlink pilot detection and synchronization channel demodulation; and the hand-in assist baseband function comprises uplink long code searching and received signal strength measurement.

9. The method of claim 1, wherein:

the first access point is assigned an access point identifier;

the indication of hand-in is received via a hand-in message from the second access point; and the hand-in message comprises an identifier of an access terminal that has reported detection of a signal comprising the access point identifier.

10. The method of claim 1, wherein the first access point comprises a femto access point.

11. An apparatus for communication, comprising:

a radio frequency receiver configured to receive downlink signals on a downlink band at a first access point; and a hand-in controller configured to reconfigure the radio frequency receiver to receive on an uplink band temporarily for a defined period of time as a result of receiving an indication of hand-in from a second access point, wherein the radio frequency receiver is configured to receive uplink signals on the uplink band as a result of the reconfiguration and to receive on the downlink band upon expiration of the defined period of time.

12. The apparatus of claim 11, further comprising at least one baseband controller configured to:

process the received uplink signals to search for signals from an access terminal identified by the indication of hand-in; and process the received downlink signals to synchronize a clock, wherein the clock is configured to free-run if the radio frequency receiver is receiving uplink signals.

13. The apparatus of claim 12, wherein:

the hand-in controller is further configured to send a message to the second access point if signals from the access terminal are detected as a result of the processing of the received uplink signals; and the message indicates whether the access terminal should be handed-in to the first access point.

14. The apparatus of claim 11, wherein the defined period of time is based on one of:

a distance between the first access point and the second access point, or a calibration of synchronization error between the first access point and the second access point.

15. The apparatus of claim 11, wherein:

signals output by the radio frequency receiver are directed to a receive synchronization baseband function if the radio frequency receiver is receiving downlink signals; and signals output by the radio frequency receiver are directed to a hand-in assist baseband function if the radio frequency receiver is receiving uplink signals.

16. An apparatus for communication, comprising:

means for receiving configured for receiving downlink signals at a first access point; and means for reconfiguring the means for receiving on an uplink band temporarily for a defined period of time as a result of receiving an indication of hand-in from a second access point, wherein the means for receiving is configured to receive uplink signals on the uplink band as a result of the reconfiguration and to receive on the downlink band upon expiration of the defined period of time.

17. The apparatus of claim 16, further comprising:

means for:

processing the received uplink signals to search for signals from an access terminal identified by the indication of hand-in; and processing the received downlink signals to synchronize a clock, wherein the clock is configured to free-run if the means for receving is receiving uplink signals.

18. The apparatus of claim 17, further comprising means for sending a message to the second access point if signals from the access terminal are detected as a result of the processing of the received uplink signals, wherein the message indicates whether the access terminal should be handed-in to the first access point.

19. The apparatus of claim 16, wherein the defined period of time is based on one of:

a distance between the first access point and the second access point, or a calibration of synchronization error between the first access point and the second access point.

20. The apparatus of claim 16, wherein:
signals output by the means for receiving are directed to a receive synchronization baseband function if the means for receiving is receiving downlink signals; and
signals output by the means for receiving are directed to a hand-in assist baseband function if the means for receiving is receiving uplink signals.

21. A computer-program product, comprising:
non-transitory computer-readable medium comprising code for causing a computer to:
receive downlink signals on a downlink band at a radio frequency receive chain of a first access point;
reconfigure the radio frequency receive chain to receive on an uplink band temporarily for a defined period of time as a result of receiving an indication of hand-in from a second access point;
receive uplink signals on the uplink band at the radio frequency receive chain as a result of the reconfiguration; and
reconfigure the radio frequency receive chain to receive on the downlink band upon expiration of the defined period of time.

22. The computer-program product of claim 21, wherein the non-transitory computer-readable medium further comprises code for causing the computer to:
process the received uplink signals to search for signals from an access terminal identified by the indication of hand-in; and
process the received downlink signals to synchronize a clock, wherein the clock is configured to free-run if the radio frequency receive chain is receiving uplink signals.

23. The computer-program product of claim 22, wherein:
the non-transitory computer-readable medium further comprises code for causing the computer to send a message to the second access point if signals from the access terminal are detected as a result of the processing of the received uplink signals;
the message indicates whether the access terminal should be handed-in to the first access point.

24. The computer-program product of claim 21, wherein the defined period of time is based on one of:
a distance between the first access point and the second access point, or
a calibration of synchronization error between the first access point and the second access point.

25. The computer-program product of claim 21, wherein:
signals output by the radio frequency receive chain are directed to a receive synchronization baseband function if the radio frequency receive chain is receiving downlink signals; and
signals output by the radio frequency receive chain are directed to a hand-in assist baseband function if the radio frequency receive chain is receiving uplink signals.

* * * * *